(12) United States Patent
Qiu

(10) Patent No.: US 10,901,985 B2
(45) Date of Patent: *Jan. 26, 2021

(54) BLOCKCHAIN-BASED DATA STORAGE AND QUERY METHOD AND DEVICE

(71) Applicant: Advanced New Technologies Co., Ltd., Grand Cayman (KY)

(72) Inventor: Honglin Qiu, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/800,756

(22) Filed: Feb. 25, 2020

(65) Prior Publication Data

US 2020/0265041 A1 Aug. 20, 2020

Related U.S. Application Data

(63) Continuation of application No. 16/585,472, filed on Sep. 27, 2019, now Pat. No. 10,713,239, which is a
(Continued)

(30) Foreign Application Priority Data

Mar. 28, 2017 (CN) .......................... 2017 1 0191771

(51) Int. Cl.
G06F 16/30 (2019.01)
G06F 16/24 (2019.01)
(Continued)

(52) U.S. Cl.
CPC .......... *G06F 16/24* (2019.01); *G06F 16/1834* (2019.01); *G06F 16/1865* (2019.01);
(Continued)

(58) Field of Classification Search
CPC ...................................................... G06F 16/24
See application file for complete search history.

(56) References Cited

U.S. PATENT DOCUMENTS 10,404,471 B1 9/2019 Griffin et al.
10,713,239 B2 7/2020 Qui
(Continued)

FOREIGN PATENT DOCUMENTS

CN 101072138 11/2007
CN 101256650 9/2008
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Mahesh H Dwivedi
(74) *Attorney, Agent, or Firm* — Fish & Richardson P.C.

(57) ABSTRACT

A blockchain node receives a service request, where the service request comprises one or more data types and respective service data corresponding to the one or more data types that are stored in a blockchain. At least one of a service type or identification information is determined corresponding to the service request. The service request is parsed to obtain each data type of the service request and service data corresponding to each data type. Based on a mapping relationship between a data type and service data, the service data that is obtained through parsing in a relational database corresponding to the blockchain node is stored.

20 Claims, 5 Drawing Sheets

Related U.S. Application Data continuation of application No. PCT/CN2018/080505, filed on Mar. 26, 2018.

(51) Int. Cl.
*G06F 16/27* (2019.01)
*G06F 16/18* (2019.01)
*G06F 16/182* (2019.01)
*G06Q 20/06* (2012.01)
*H04L 9/00* (2006.01)
*H04L 9/06* (2006.01)

(52) U.S. Cl.
CPC ......... *G06F 16/27* (2019.01); *G06Q 20/0658* (2013.01); *H04L 9/006* (2013.01); *H04L 9/0637* (2013.01)

(56) References Cited

U.S. PATENT DOCUMENTS

| | | |
|---|---|---|
| 2011/0119088 A1 | 5/2011 | Gunn |
| 2015/0379510 A1 | 12/2015 | Smith |
| 2016/0267566 A1 | 9/2016 | Levitt et al. |
| 2016/0292672 A1 | 10/2016 | Fay et al. |
| 2016/0321654 A1 | 11/2016 | Lesavich et al. |
| 2017/0005804 A1 | 1/2017 | Zinder |
| 2017/0085555 A1 | 3/2017 | Bisikalo et al. |
| 2019/0042620 A1 | 2/2019 | Garagiola et al. |
| 2019/0079998 A1 | 3/2019 | Rush |
| 2019/0102761 A1 | 4/2019 | Pandian |
| 2019/0146946 A1 | 5/2019 | Zhang |
| 2019/0171744 A1 | 6/2019 | Ananthapur Bache et al. |
| 2019/0179939 A1 | 6/2019 | Govindarajan et al. |
| 2019/0180047 A1* | 6/2019 | Matetic ................. H04L 9/3247 |
| 2020/0026700 A1 | 1/2020 | Qiu |

FOREIGN PATENT DOCUMENTS

| | | |
|---|---|---|
| CN | 103713859 | 4/2014 |
| CN | 105404701 | 3/2016 |
| CN | 105487816 | 4/2016 |
| CN | 106383754 | 2/2017 |
| CN | 106445993 | 2/2017 |
| CN | 106506638 | 3/2017 |
| CN | 107239479 | 10/2017 |
| EP | 3054405 | 8/2016 |
| JP | 2017207979 | 11/2017 |
| KR | 101701131 | 2/2017 |
| RU | 2589327 | 7/2016 |
| WO | WO 2016149834 | 9/2016 |
| WO | WO 2017036546 | 3/2017 |

OTHER PUBLICATIONS

Extended European Search Report in European Application No. 18774448.7, dated Aug. 22, 2019, 8 pages.
Nakamoto, "Bitcoin: A Peer-to-Peer Electronic Cash System," www.bitcoin.org, 2005, 9 pages.
PCT International Search Report and Written Opinion in International Application No. PCT/CN2018/080505, dated Jun. 27, 2018, 14 pages (with English Translation).
PCT International Preliminary Report on Patentability in International Application No. PCT/CN2018/080505, dated Oct. 1, 2019, 10 pages (with English translation).

* cited by examiner

| Data table corresponding to public key 1 | | | |
|---|---|---|---|
| table commodity | | | |
| name | number | cost | |
| trousers#42wil | | 322 | |
| blouse#4212v | | 211 | |

FIG. 2 ns and their descriptions

BLOCKCHAIN-BASED DATA STORAGE AND QUERY METHOD AND DEVICE

CROSS-REFERENCE TO RELATED APPLICATIONS

This application is a continuation of U.S. patent application Ser. No. 16/585,472, filed on Sep. 27, 2019, which is a continuation of PCT Application No. PCT/CN2018/080505, filed on Mar. 26, 2018, which claims priority to Chinese Patent Application No. 201710191771.7, filed on Mar. 28, 2017, and each application is hereby incorporated by reference in its entirety.

TECHNICAL FIELD

The present application relates to the field of computer technologies, and in particular, to a blockchain-based data storage and query method and device.

BACKGROUND

With continuous development of computer technologies, the blockchain technology, which is a new distributed data storage technology, becomes increasingly popular because data stored in a blockchain is credible, as tamper-resistance is a feature of the blockchain technology (which can also be referred to as a distributed ledger technology).

A principle of data storage in the blockchain can be understood as follows: A user initiates a service request by using an Ethereum client (namely, a client that supports the blockchain technology, which can also be referred to as a blockchain client). The Ethereum client can send the service request to a consensus network. Each blockchain node in the consensus network performs a consensus procedure on the service request. Each blockchain node in the consensus network stores a data digest of the service request in a blockchain corresponding to each blockchain node after achieving a consensus on the service request. In addition, the Ethereum client can store, based on a predetermined data storage format specified in a smart contract, service data in the service request in a storage medium corresponding to the Ethereum client.

To subsequently help query data stored in the storage medium, an index is usually created in a predetermined way, so that the user can perform, by using the index, a query operation on the service data stored in the storage medium.

However, in practice, once a query condition used for querying the service data is different from the created index (in other words, the query condition does not match an index specified in the smart contract), data query efficiency is relatively low, or the query fails.

SUMMARY

An implementation of the present application provides a data storage method, to alleviate problems in the existing technology such as query efficiency is low or query fails when data stored in a blockchain is queried.

An implementation of the present application provides a data storage method, including: receiving, by a blockchain node, a service request; parsing the service request to obtain each data type and service data corresponding to each data type; and storing, based on a mapping relationship between a data type and service data, the service data that is obtained through parsing in a database corresponding to the blockchain node.

An implementation of the present application provides a data storage device, to alleviate problems in the existing technology such as query efficiency is low or query fails when data stored in a blockchain is queried.

An implementation of the present application provides a data storage device, including: a receiving module, configured to receive a service request; a data parsing module, configured to parse the service request to obtain each data type and service data corresponding to each data type; and a storage module, configured to store, based on a mapping relationship between a data type and service data, the service data that is obtained through parsing in a database corresponding to the blockchain node.

An implementation of the present application provides a data query method, to alleviate problems in the existing technology such as query efficiency is low or query fails when data stored in a blockchain is queried.

An implementation of the present application provides a data query method, including: receiving, by a blockchain node, a service data query request; determining, based on the service data query request, a data type corresponding to service data to be queried; and querying service data that matches the data type from a database corresponding to the blockchain node, where the database includes a mapping relationship between a data type and service data.

An implementation of the present application provides a data query device, to alleviate problems in the existing technology such as query efficiency is low or query fails when data stored in a blockchain is queried.

An implementation of the present application provides a data query device, including: a request receiving module, configured to receive a service data query request; a type determining module, configured to determine, based on the service data query request, a data type corresponding to service data to be queried; and a data query module, configured to query service data that matches the data type from a database corresponding to the device, where the database includes a mapping relationship between a data type and service data.

At least one of the previously described technical solutions used in the implementations of the present application can achieve the following beneficial effects:

In the implementations of the present application, after receiving the service request sent by the user, the blockchain node can parse the service request to obtain each data type and the service data corresponding to each data type, and store, based on the mapping relationship between a data type and service data, the service data that is obtained through parsing in the database corresponding to the blockchain node. The service data is obtained through parsing, and the service data can be stored, based on the mapping relationship between a data type and service data, in the database corresponding to the blockchain node. As such, a user can query service data based on such a mapping relationship in the database, thereby alleviating a problem in the existing technology of performing query in a blockchain based on an index, and effectively improving flexibility and efficiency of data query in a blockchain.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings:

FIG. 2 is a schematic diagram illustrating a data table, according to an implementation of the present application;

DESCRIPTION OF IMPLEMENTATIONS

To make a person skilled in the art understand the technical solutions in the present application better, the following clearly and comprehensively describes the technical solutions in the implementations of the present application with reference to the accompanying drawings in the implementations of the present application. The described implementations are merely some but not all of the implementations of the present application. All other implementations obtained by a person of ordinary skill in the art based on the implementations of the present application without creative efforts shall fall within the protection scope of the present application.

Figure 1:
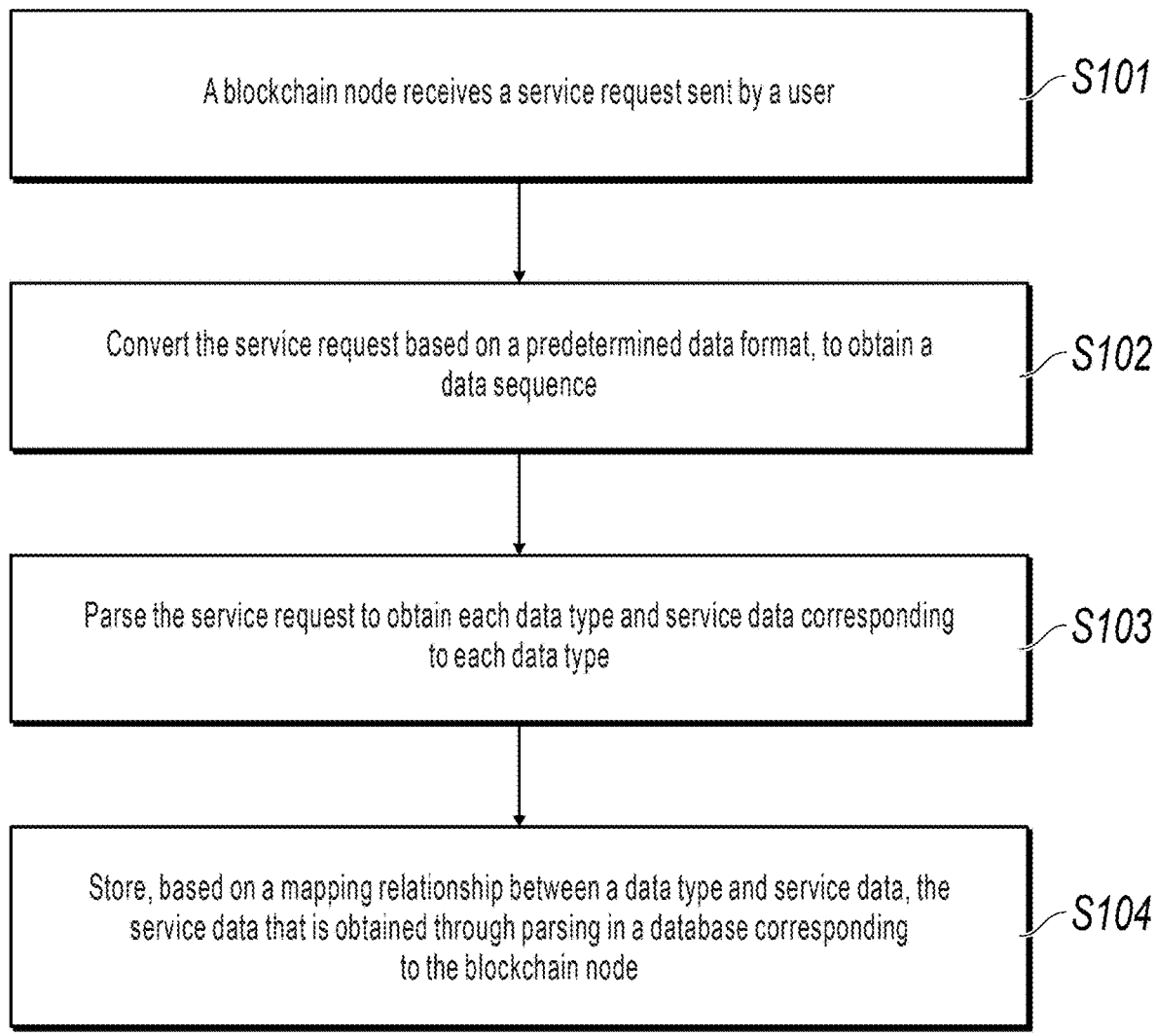
FIG. 1 is a schematic diagram illustrating a data storage process, according to an implementation of the present application.

FIG. 1 is a schematic diagram illustrating a data storage process, according to an implementation of the present application. The process includes the following steps.

S101. A blockchain node receives a service request.

In practice, in a service processing process, a user can send a service request to the blockchain node. The blockchain node can be an end-user device or a server. For example, when the blockchain node is a server, the user can fill in service information on an end-user device held by the user. After the user performs a specified operation on the end-user device, the end-user device sends the service information filled in by the user to the server in a form of a service request. Correspondingly, the server can receive the service request.

When the blockchain node is an end-user device, the user can fill in service information on the end-user device. The end-user device can generate a corresponding service request when determining that the user performs a specified operation (for example, the user performs a tap operation). This is equivalent to receiving the service request sent by the user.

Certainly, the blockchain node can alternatively be a blockchain client (which is referred to as a client that can process a related service that is based on a blockchain technology, for example, an Ethereum client). Correspondingly, when performing service processing by using a blockchain consensus network, the user can start the blockchain client by using an end-user device, and fill in service information on an interface displayed by the blockchain client. The blockchain client can generate a corresponding service request based on the service information filled in by the user when detecting that the user performs a specified operation. This is equivalent to receiving the service request sent by the user. In addition, the service request received by the blockchain node can alternatively be broadcast by another blockchain node.

S102. Convert the service request based on a predetermined data format, to obtain a data sequence.

The blockchain node can convert the service request based on the predetermined data format after receiving the service request, to obtain the corresponding data sequence.

In the present implementation of the present application, the predetermined data format includes but is not limited to the following fields: an identification information field and a service type field.

The identification information field is used to distinguish between service data at a user level, for example, information that can uniquely identify the user and is included in the service request, such as a user public key or a user identity (ID), so that the service data can be queried in a user dimension.

The service type field is used to distinguish between service data of various services of a user, so that the user can subsequently query the service data in a service dimension in a service data query process.

In addition, a data field is specified in the predetermined data format. The data fields are used to indicate a mapping relationship between each data type and each piece of service data in a service request. For example, assume that a service request includes the following data fields: name—Xiaoming, age—18, and weight—65 kg. In this information, the actual service data is Xiaoming, 18, and 65 kg, and name, age, and weight are data types of the service data. In other words, in the present example implementation of the present application, the data type is equivalent to a key, the service data is equivalent to a value, and the data field is a key-value data mapping set.

Based on the previously described predetermined data format, after receiving the service request sent by the user, the blockchain node can parse, based on the predetermined data format, the service request to obtain data content included in the service request, such as identification information, a service type, service data corresponding to each data type, and each data type that are in a data field. The blockchain node then can serialize, in a specific form, the data obtained through parsing, to obtain a data sequence.

For example, assume that after receiving the service request sent by the user, the blockchain node obtains the following fields by parsing the service request based on the predetermined data format: a service type field: commodity; an identification information field: PublicKey; a data field name: umbrella; and cost: 46. The blockchain node serializes, in a specific form, these fields obtained through parsing, and obtains the following data sequence:

{"PublicKey.schema": "DEFAULT", "data": "name: umbrella, cost: 46"}.

The service request is converted into the data sequence based on the predetermined data format because in the present implementation of the present application, the blockchain node needs to write the service request to a blockchain for subsequent service data verification. In practice, the blockchain node usually needs to write the service request to the blockchain based on a specific data format. Therefore, after receiving the service request sent by the user, the blockchain node needs to convert, based on the predetermined data format, the service request into a data format, namely, a data sequence, for supporting writing the service request to the blockchain in a subsequent process, and further writes the service request to the blockchain in a form of the data sequence, so that the service data can be effectively verified based on the service request stored in the blockchain.

It is worthwhile to note that, in the present implementation of the present application, the blockchain node can alternatively parse the service request to obtain each data type and service data corresponding to each data type, and then convert, based on the predetermined data format, the service data corresponding to each data type and each data type that are obtained through parsing, to obtain the data sequence. Alternatively, after obtaining, through parsing, each data type and the service data corresponding to each data type, the blockchain node can first store, based on a mapping relationship between a data type and service data, the service data that is obtained through parsing in a database corresponding to the blockchain node (in other words, perform step S103), and then convert, based on the predetermined data format, each data type included in the service request and the service data corresponding to each data type, to obtain the data sequence.

In other words, in the present implementation of the present application, the step of converting the service request based on a predetermined data format, to obtain a data sequence is optional.

A specific implementation process involved in step S102 of converting the service request based on a predetermined data format, to obtain a data sequence is not necessarily a process of parsing the service request to obtain each data type and the service data corresponding to each data type, and then converting, based on the predetermined data format, the service data corresponding to each data type and each data type that are obtained through parsing, to obtain the data sequence. The data sequence can alternatively be generated by using another field in the service request other than the service data corresponding to each data type and each data type that are obtained by parsing the service request. A specific field that is needed for generating the data sequence depends on an actually needed data format for supporting writing the service request to the blockchain.

S103. Parse the service request to obtain each data type and service data corresponding to each data type.

In the present implementation of the present application, after receiving the service request, the blockchain node can first send the service request to other blockchain nodes in a consensus network through broadcast, so that each blockchain node in the consensus network performs consensus procedure on the service request. Each blockchain node can store the service request in a blockchain corresponding to the blockchain node after determining that each blockchain node in the consensus network achieves a consensus on the service request.

In addition, in the present implementation of the present application, after receiving the service request, the blockchain node can parse the service request to obtain each data type included in the service request and the service data corresponding to each data type, and store, based on the mapping relationship between a data type and service data, the service data that is obtained through parsing in the database corresponding to the blockchain node in a subsequent process.

The database mentioned in the present implementation of the present application can be a relational database. In such a data storage method, data can be quickly queried, and query is not affected by a query condition. In other words, even if an index field changes, service data stored in the database can still adapt to a new index field, and service data queried by a user is not affected by a change of the index field used for querying the service data.

In the present implementation of the present application, during service data storage, the blockchain node can distinguish, based on a service type or identification information, between service data to be stored, so that service data corresponding to different service types or identification information can be stored in different databases. As such, a user can precisely query service data in a service type or identification information dimension in a subsequent service data query process.

Based on this, in addition to parsing the service request to obtain each data type and the service data corresponding to each data type, the blockchain node can obtain, through parsing, a service type and identification information that are corresponding to the service data included in the service request, then convert, based on a predetermined statement format, each data type, the service data corresponding to each data type, the service type, and the identification information that are obtained through parsing, to obtain a data storage statement, and store, by executing the data storage statement, the service data that is obtained through parsing in the database corresponding to the blockchain node in a subsequent process.

For example, the blockchain node determines, by parsing the service request, that the service data to be stored is shoes#12xew and 158, the service type corresponding to the service data to be stored is commodity, the identification information corresponding to the service data to be stored is PublicKey1, and the data types respectively corresponding to the service data shoes#12xew and 158 are name and cost. The blockchain node can convert, based on the predetermined statement format, the service type, the identification information, the service data corresponding to each data type, and each data type that are obtained through parsing, to obtain the corresponding data storage statement. An example form is as follows:

insert into "PublicKey1.schema: commodity" (name, cost) value ('shoes#12xew', '158').

The blockchain node can store, by executing the data storage statement, the service data in the database corresponding to the blockchain node in a subsequent process.

The blockchain node can parse the service request by using a predetermined parsing program. The parsing program specifies a data format to be used for parsing and a field to be parsed. The blockchain node can parse the service request by running the parsing program. The parsing program can be compiled by the operation and maintenance personnel of the blockchain node based on an actual need.

It is worthwhile to note that, different from storing the service data in the database in the service type and identification information dimension, if the blockchain node corresponds to a single database, different data tables can be set in the database. Each service type and each piece of identification information can correspond to one data table. As such, the blockchain node can store the service data in data tables in the database based on a service type and identification information. Certainly, the service data corresponding to the service type and the identification information can be distinguished in the database in a form other than the form of the data table. Details are omitted here for simplicity.

It is worthwhile to note that, in the present implementation of the present application, the blockchain node can perform step S103 before performing step S102, can perform step S102 before performing step S103, or can perform S102 to obtain the data sequence before performing step S103 to parse the obtained parsing sequence to obtain, based on the method shown in step S103, each data type and the service data corresponding to each data type. Step S102 and step S103 can be simultaneously performed in the present implementation of the present application. No specific limitation is imposed here.

S104. Store, based on a mapping relationship between a data type and service data, the service data that is obtained through parsing in a database corresponding to the blockchain node.

In the present implementation of the present application, after obtaining, by parsing the service request, each data type and the service data corresponding to each data type, the blockchain node can store the service data that is obtained through parsing in data types in the database.

For service data corresponding to different service types and identification information, the blockchain node can determine, based on the service types and the identification information that are obtained through parsing, a database corresponding to the service types and the identification information, and then the blockchain node can respectively store the service data that is obtained through parsing in the data types in the database.

After obtaining the data storage statement by performing step S103, the blockchain node can execute the data storage statement to determine the service type and the identification information that correspond to the service data to be stored. The blockchain node then can further determine whether the blockchain node corresponds to a database corresponding to the service type and the identification information. If yes, the blockchain node can further separately store the service data that is obtained through parsing in the data types in the database. If no, the blockchain node needs to create, based on the determined service type and the determined identification information, a database corresponding to the service type and the identification information, so that the blockchain node stores the service data in the database.

Certainly, in the present implementation of the present application, if the blockchain node corresponds to a single database, the blockchain node can determine whether the database includes a data table corresponding to the service type and the identification information. If yes, the blockchain node separately stores the service data that is obtained through parsing in data types in the data table. If no, the blockchain node creates, by using a predetermined table creation method, a data table corresponding to the service type and the identification information, and then stores the service data that is obtained through parsing in the data table.

For example, assume that the blockchain node determines the following fields by executing the data storage statement: a service type field corresponding to the service data to be stored is "commodity"; and a user public key is "PublicKey1", which is used to indicate the identification information (because an actual user public key can be relatively complex, the user public key is merely simply indicated by using PublicKey1 here). The blockchain node can further determine whether the database corresponding to the blockchain node includes a data table that includes the identification information PublicKey1 and the service type commodity. When determining that the data table does not exist, the blockchain node creates the data table corresponding to the service type commodity and the identification information PublicKey1 in the database based on the determined service type commodity, the determined identification information PublicKey1, and the predetermined table creation method. An execution statement is as follows:

create table "PublicKey1.schema: commodity" if "PublicKey1.schema: commodity" not exist.

After determining (or creating), by executing the data storage statement, the data table corresponding to the service data in the database corresponding to the blockchain node, the blockchain node can determine whether the data table includes each data type included in the service data. If yes, the blockchain node creates a row or a column corresponding to the data type in the data table. If no, the blockchain node can add a row/column corresponding to the data type to the data table based on the data type and a predetermined row/column creation method.

Continuing with the previous example, the blockchain node determines a data field: name: shoes#12xew and cost: 158 in the data sequence. In the data field, name and cost are data types, and are equivalent to keys, and the service data corresponding to name and cost is equivalent to a value. The blockchain node can determine whether the data table determined based on the service type commodity and the identification information PublicKey1 includes each data type in the data field. If yes, the blockchain node does not create a column corresponding to the data type in the database. If no, the blockchain node can add a column corresponding to the data type to the data table based on the data type and the predetermined column creation method (if the data table is created in a row dimension, the row creation method can be used). A specific execution statement is as follows:

create column "name" if "PublicKey1.schema: commodity". "name" not exist; create column "cost" if "PublicKey1.schema: commodity". "cost" not exist.

After determining, by executing the data storage statement, the data type (the data type can previously exist in the database or can be created by the blockchain node by executing the data storage statement) corresponding to the service data to be stored in the database, the blockchain node can store the service data in the data type in the database. Certainly, if the blockchain node determines that the data type corresponding to the service data to be stored is in a certain data table (namely, the data table that matches the service type and the identification information) in the database, the blockchain node can store the service data that is obtained through parsing in the data type in the data table, as shown in FIG. 2.

FIG. 2 is a schematic diagram illustrating a data table, according to an implementation of the present application.

In FIG. 2, name and cost are the data types of the service data, PublicKey1 is the identification information corresponding to the service data, commodity is the service type corresponding to the service data, and each data type records service data corresponding to the data type. As such, when a user subsequently queries service data, the blockchain node can receive a service data query request sent by the user, and further query service data that matches the service data query request from the database. A query process can be as follows: after receiving the service data query request, the blockchain node can first determine a service type and identification information that are included in the service data query request. Then the blockchain node can determine a data table that matches the service type and the identification information in the database, and further query, from the data table based on a mapping relationship that is between a data type and service data and is recorded in the data table, the service data that is to be queried based on the service data query request.

For example, assume that the service data query request received by the blockchain node includes the following fields: PublicKey: PublicKey1, schema: commodity, and name: blouse#4212v. The blockchain node can determine, in the service data query request, that a service type corresponding to the service data query request is commodity, and identification information is PublicKey1, then identify a data table that matches the service type commodity and the identification information PublicKey1 from the database corresponding to the blockchain node, and identify service data 211 corresponding to the index field blouse#4212v from the data table based on the index field blouse#4212v.

Certainly, if service data is distinguished based on only the data type, after receiving the service data query request sent by the user, the blockchain node can determine, based on the service data query request, a data type corresponding to service data to be queried, and then query service data that matches the data type from the database corresponding to the blockchain node. When determining the data type, after receiving the service data query request sent by the user, the blockchain node can determine an index field, namely, a key, included in the service data query request, and determine the index field, namely, the key, as the data type corresponding to the service data to be queried.

In the data table, in addition to querying service data by using the key as the index field, the service data can be queried by creating an index by a user. For example, continuing with the previous example, if the user needs to query service data based on a price range, the user can enter the price range into the blockchain node. The blockchain node can query, based on the price range entered by the user, service data that satisfies the price range from the data table in the database, and return the service data that satisfies the condition to the user for viewing.

In the existing technology, the blockchain node needs to write service data to a blockchain based on a data storage format specified in a smart contract. In addition, the blockchain node usually stores, based on the data storage format, the service data in a memory corresponding to the blockchain node by default. Therefore, in a process of compiling the smart contract, it is usually specified that the blockchain node stores, based on the specified data storage format, the service data in the memory corresponding to the blockchain node. Correspondingly, when a user queries service data from the blockchain node by using the smart contract, the user also needs to query, in a fixed query way (for example, by using an index field in a fixed form), the corresponding service data from the memory corresponding to the blockchain node.

However, in practice, the index field used by the user for querying the service data is not unique. Consequently, an index field to be used by the user to query the service data may be not specified in the smart contract. Once the user uses an index field that does not satisfy the smart contract, the blockchain node cannot identify previous service data from the blockchain node by using the smart contract.

For example, when the blockchain node stores, based on the predetermined data storage format by using the smart contract, the service request in the memory corresponding to the blockchain node, the user can subsequently query the service data from the memory only by using a key as an index field. However, the blockchain node stores all pieces of service data one by one based on the specified data format specified in the smart contract by using the smart contract, in other words, does not store the service data in a form of a data table in the relational database. Therefore, when the user needs to query service data based on content recorded in a value, the smart contract cannot effectively support a query field entered by the user into the blockchain node. Consequently, the user cannot identify, by using the smart contract, previous service data from the memory corresponding to the blockchain node (because the previous service data can be queried only by using a key as an index field). Alternatively, the blockchain node can identify the corresponding service data from the memory corresponding to the blockchain node only when the blockchain node traverses the memory for a long time based on the query field entered by the user.

In the present implementation of the present application, after receiving the service request sent by the user, the blockchain node can parse the service request to determine each data type included in the service request and the service data corresponding to each data type, and finally store, based on the mapping relationship between a data type and service data, the service data that is obtained through parsing in the database corresponding to the blockchain node. As such, a user can query service data based on such a mapping relationship in the database, thereby alleviating a problem in the existing technology of performing query in a blockchain based on an index, and effectively improving flexibility and efficiency of data query in a blockchain.

It is worthwhile to note that, in the present implementation of the present application, service data of users can be distinguished in the database based on only identification information, and service type classification is not performed for all the users. Therefore, in the previous process, the blockchain node can create the database, create the data table in the database, or determine the data table in the database based on the identification information. Certainly, the service data can be distinguished in the database based on only a service type. A specific way can be used to distinguish between the service data, depending on a service need.

Figure 3:
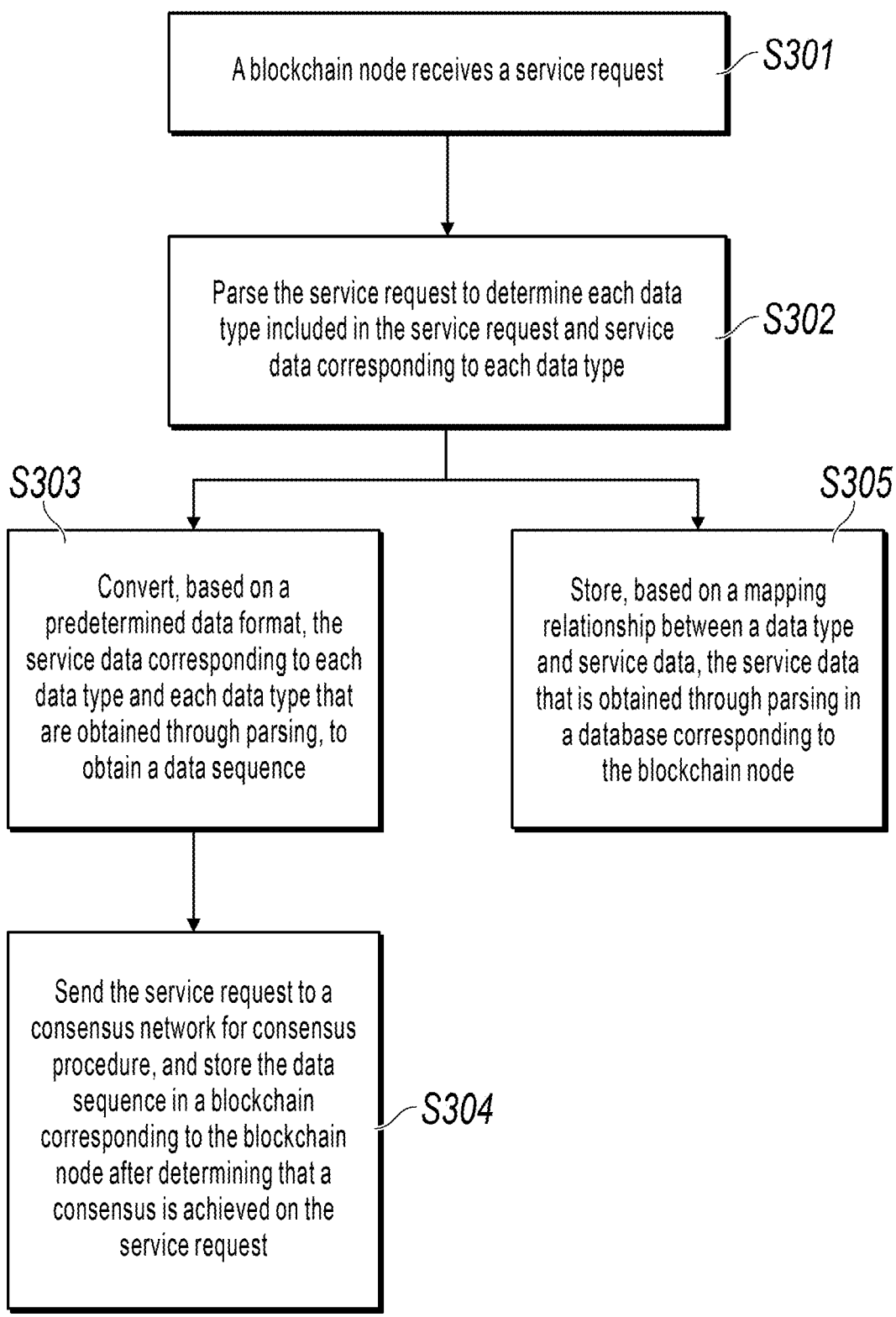
FIG. 3 illustrates a detailed data storage process, according to an implementation of the present application.

To further describe the data storage process provided in the previous implementation, in an implementation of the present application, the data storage method provided in the present application is further described by using a specific execution process, as shown in FIG. 3.

FIG. 3 illustrates a detailed data storage process, according to an implementation of the present application. The process includes the following steps.

S301. A blockchain node receives a service request.

The blockchain node can receive a service request sent by a user by using an end-user device. The blockchain node can be an end-user device, can be a server, or can be a client that can process a related service that is based on a blockchain technology.

S302. Parse the service request to determine each data type included in the service request and service data corresponding to each data type.

After receiving the service request, the blockchain node can parse the service request to determine each data type included in the service request and the service data corresponding to each data type. The blockchain node can parse the service request by using a predetermined parsing program. The parsing program can be set by the operation and maintenance personnel of the blockchain node based on an actual need.

S303. Convert, based on a predetermined data format, the service data corresponding to each data type and each data type that are obtained through parsing, to obtain a data sequence.

After obtaining each data type included in the service request and the service data corresponding to each data type by parsing the service request, the blockchain node can convert, based on the predetermined data format, the service data corresponding to each data type and each data type that are obtained through parsing, to obtain the data sequence. A specific process of obtaining the data sequence can be as follows: The blockchain node can serialize, in a specific form, the data that is obtained through parsing, to obtain the corresponding data sequence.

S304. Send the service request to a consensus network for consensus procedure, and store the data sequence in a blockchain corresponding to the blockchain node after determining that a consensus is achieved on the service request.

When receiving the service request, the blockchain node can send the service request to the consensus network, so that another blockchain node in the consensus network performs consensus procedure on the service request. After determining that the another blockchain node achieves a consensus on the service request, the blockchain node can store, in a form of the data sequence, the service request in the blockchain saved by the blockchain node for subsequent service data verification.

In the present implementation of the present application, each time the blockchain node receives a service request, the blockchain node sends the service request to the consensus network for consensus procedure. Alternatively, the blockchain node can first receive service requests sent by users, pack the received service requests into a preprocessing block when determining that a consensus phase arrives, and send the preprocessing block to the consensus network for consensus procedure. Correspondingly, after receiving the service requests sent by the users, the blockchain node can parse the service requests one by one to determine a data type and service data corresponding to the data type that are included in each service request, and then convert, based on the predetermined data format, the data type and the service data corresponding to the data type that are included in each service request, to obtain each data sequence.

After determining that the another blockchain node in the consensus network achieves a consensus on the preprocessing block sent to the consensus network, the blockchain node can store, in a form of each data sequence corresponding to each service request, each service request included in the preprocessing block in the blockchain included in the blockchain node.

S305. Store, based on a mapping relationship between a data type and service data, the service data that is obtained through parsing in a database corresponding to the blockchain node.

When converting each data type and the service data that are obtained through parsing, the blockchain node can store, based on the mapping relationship between a data type and service data, the service data that is obtained through parsing in the database corresponding to the blockchain node, to ensure that a user can subsequently identify corresponding service data from the database based on the mapping relationship between a data type and service data.

The blockchain node can concurrently perform step S303 and step S305. In other words, when the blockchain node converts the service data corresponding to each data type and each data type that are obtained through parsing, to obtain the data sequence, the blockchain node can store, based on a mapping relationship between a data type and service data, the service data that is obtained through parsing in a database corresponding to the blockchain node.

Certainly, after determining that the another blockchain node in the consensus network achieves a consensus on the service request, the blockchain node can store, based on the mapping relationship between a data type and service data, the service data that is obtained through parsing in the database corresponding to the blockchain node.

The above has described the data storage method and the data query method provided in the implementations of the present application. Based on the same concept, the implementations of the present application further provide a data storage device and a data query device, as shown in FIG. 4 and FIG. 5.

Figure 4:
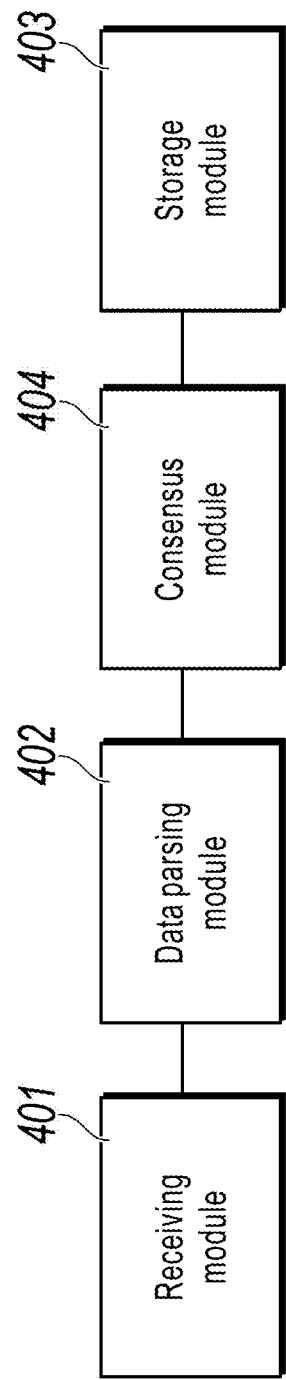
FIG. 4 is a schematic diagram illustrating a data storage device, according to an implementation of the present application.
Figure 5:
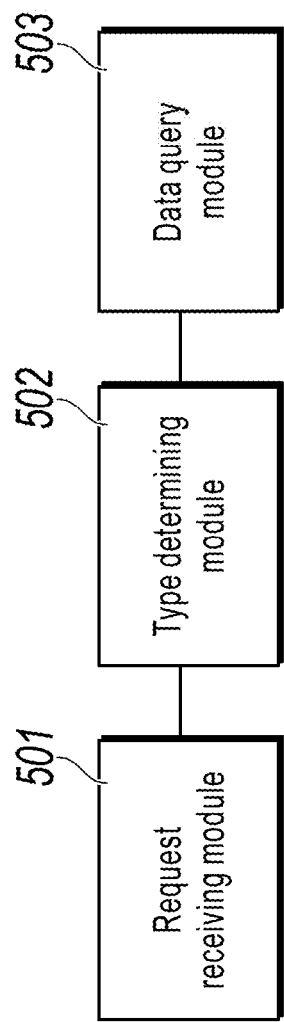
FIG. 5 is a schematic diagram illustrating a data query device, according to an implementation of the present application.

FIG. 4 is a schematic diagram illustrating a data storage device, according to an implementation of the present application. The device includes: a receiving module 401, configured to receive a service request; a data parsing module 402, configured to parse the service request to obtain each data type and service data corresponding to each data type; and a storage module 403, configured to store, based on a mapping relationship between a data type and service data, the service data that is obtained through parsing in a database corresponding to the blockchain node.

The device further includes: a consensus module 404, configured to convert, based on a predetermined data format, each data type included in the service request and the service data corresponding to each data type, to obtain a data sequence; perform consensus procedure on the service request by using a consensus network; and store the data sequence in a blockchain corresponding to the device after a consensus is achieved on the service request.

The data parsing module 402 determines at least one of a service type or identification information corresponding to the service request.

The storage module 403 converts, based on a predetermined statement format, at least one of each data type, the service data corresponding to each data type, the service type, or the identification information that are obtained through parsing, to obtain a data storage statement; and stores the service data that is obtained through parsing in the database by executing the data storage statement.

The storage module 403 creates, based on at least one of the service type or the identification information, a database corresponding to at least one of the service type or the identification information when determining, by executing the data storage statement, that no database that matches at least one of the service type or the identification information is identified; and stores the service data that is obtained through parsing in the created database.

The storage module 403 creates each data type that is obtained by parsing the data sequence in the database when determining that the database does not include the data type; and stores service data corresponding to the data type in the database.

FIG. 5 is a schematic diagram illustrating a data query device, according to an implementation of the present application. The device includes: a request receiving module 501, configured to receive a service data query request; a type determining module 502, configured to determine, based on the service data query request, a data type corresponding to service data to be queried; and a data query module 503, configured to query service data that matches the data type from a database corresponding to the device, where the database includes a mapping relationship between a data type and service data.

In the implementations of the present application, after receiving the service request sent by the user, the blockchain node can parse the service request to obtain each data type and the service data corresponding to each data type, and store, based on the mapping relationship between a data type and service data, the service data that is obtained through parsing in the database corresponding to the blockchain node. The service data is obtained through parsing, and the service data can be stored, based on the mapping relationship between a data type and service data, in the database corresponding to the blockchain node. As such, a user can query service data based on such a mapping relationship in the database, thereby alleviating a problem in the existing technology of performing query in a blockchain based on an index and effectively improving flexibility and efficiency of data query in a blockchain.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be, a microprocessor or a processor, or a computer readable medium that stores computer readable program code (such as software or firmware) that can be executed by the microprocessor or the processor, a logic gate, a switch, an application-specific integrated circuit (ASIC), a programmable logic controller, or an embedded microprocessor. Examples of the controller include but are not limited to the following microprocessors: ARC 625D, Atmel AT91SAM, Microchip PIC18F26K20, and Silicon Labs C8051F320. The memory controller can also be implemented as a part of control logic of a memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device configured to implement various functions in the controller can also be considered as a structure in the hardware component. Or the device configured to implement various functions can even be considered as both a software module implementing the method and a structure in the hardware component.

The system, device, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the device above is described by dividing functions into various units. Certainly, when the present application is implemented, a function of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. In addition, the implementations of the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, removable, and irremovable media that can store information by using any method or technology. The information can be a computer readable instruction, a data structure, a program module, or other data. Examples of the computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. As described in the present specification, the computer readable medium does not include computer-readable transitory media such as a modulated data signal and a carrier.

It is worthwhile to further note that the terms "include", "comprise", or their any other variants are intended to cover a non-exclusive inclusion, so that a process, a method, a product or a device that includes a list of elements not only includes those elements but also includes other elements that are not expressly listed, or further includes elements inherent to such process, method, product or device. An element described by "includes a . . . " further includes, without more constraints, another same or identical element in the process, method, product, or device that includes the element.

A person skilled in the art should understand that an implementation of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In the distributed computing environment, the program module can be located in both local and remote computer storage media including storage devices.

The implementations in the present specification are described in a progressive way. For same or similar parts of the implementations, reference can be made to the implementations. Each implementation focuses on a difference from other implementations. Particularly, a system implementation is basically similar to a method implementation, and therefore is described briefly. For related parts, reference can be made to related descriptions in the method implementation.

The previous descriptions are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

In some examples, a service request is a request that triggers a smart contract operation, a call, or a transaction, and the actual computer hardware performing these operations is the consensus network having multiple physical nodes. For example, a service request includes a request to query, a request to create a smart contract, a request to execute a smart contract, a request for information, a request to transfer cryptocurrency, etc.

In this specification, a blockchain node refers to a node in a blockchain network implemented by software installed on physical server or on a virtual server hosted by a physical server to support the functions of the blockchain network. Blockchain nodes are connected to each other and they repeatedly exchange the latest blockchain data with each other so all nodes can maintain a copy of the blockchain data. A blockchain node can be any appropriate device that is connected to the Internet, such as computers, laptops, mobile phones, and servers.

In some implementations, a blockchain node's functions include: check if a block of transactions is valid and accept or reject it; save and store blocks of transaction; broadcast the transaction history to other nodes that may need to be updated on the transaction history. In some blockchain networks, a blockchain node can be a full node or a light node. A full node stores the full blockchain data available on disk and can serve the network with any data on request. A full node also receives new transactions and blocks while participating in block validation. A light node stores the blockchain headers only and requests everything else on demand. A light node can verify the validity of the data against the state roots in the block headers.

When the blockchain node is an end-user device, the user can fill in service information on the end-user device. The end-user device can generate a corresponding service request when determining that the user performs a specified operation (for example, the user performs a tap operation). A tap operation is an operation needed to complete the generation of a service request, e.g., receiving user input. In an example, the end-user device is a mobile phone. The user touches a button on the mobile phone's screen to complete filling in the service information of a service request and the mobile phone then sends out the service request.

In some implementations, the blockchain consensus network is a network comprising multiple blockchain nodes that participate in the consensus process in the blockchain system. Because a blockchain is a decentralized system, there is not a central authority figure to make decisions. For a blockchain to make decisions, the blockchain nodes need to come to a consensus using consensus methods.

After receiving the service request sent by the user, the blockchain node can parse, based on the predetermined data format, the service request to obtain data content included in the service request, such as identification information, a service type, service data corresponding to each data type, and each data type that are in a data field. The blockchain node then can serialize, in a specific form, the data obtained through parsing, to obtain a data sequence. The ordering of the data content in the data sequence is important. The blockchain node can store the service request in the blockchain in the form of data sequence. To enable the storing of the data sequence, the ordering of the data content in the data sequence needs to comply a rule that is defined by a smart contract.

In some implementations, creation of a service type involves a creation of a smart contract on the blockchain. The service type information is then taken to create a table in database with it.

In some implementations, a data type is a key, and the service data corresponding to the data type is a value. A key is the name of an attribute for a data record in a table of a database, such as a column in a two-dimensional table that saves each data record in a row. A data type can be used as a key, which is then used to create and update a data table. For example, given the data types of a data field in a service request, the blockchain node can determine whether the data table includes each data type. If yes, the blockchain node does not create a column corresponding to the data type in the database. If no, the blockchain node can add a column corresponding to the data type to the data table based on the data type. In some cases, a key is included in a service data query request as an index field to locate a data record.

In the existing technology, the blockchain node stores service data based on the data format specified in the smart contract. For example, in some blockchain networks, a smart contract specifies a Merkle tree as the data format to store transactions. The value of a transaction is stored on a leaf node of the Merkle tree. An address, such as a hash value of the transaction, is generated to uniquely identify the transaction and the address specifies a path from the root of the Merkle tree to the leaf node that stores the transaction. Thus, a transaction is stored in the blockchain in the form of a key-value pair, where the key is the address and the value is the transaction. To store a transaction in some blockchains, for example, a smart contract is executed to write the data of the transaction in the blockchain.

In conventional blockchains, service data, such as transactions, accounts, contracts, etc, can be queried in a number of ways, which suffer from the drawbacks described below.

First, a smart contract can be invoked to directly access the service data by using the address of the service data. However, this approach requires recording the address of the service data. It also does not support more advanced query such as querying service data that satisfies arbitrary conditions.

Second, service data can be queried using a predetermined index to determine an address of the service data to be queried, and then the determined address can be used to query the service data. A smart contract specifies mapping relationships between the indexes and the addresses. However, some blockchain clients (Geth and Parity, for example) maintain only a limited set of indexes for querying the blockchain. For example, one cannot look up a transaction by sender, because the mapping relationship between the sender and the address of the sender's transaction is not established. Therefore, when a user needs to query service data based on content recorded in the service data and the content is not a predetermined index, the smart contract does not support the query.

Third, if neither an address of a service data nor an index is not available, the service data can be queried by performing a sequential access in the blockchain. In some blockchains, it is possible to start at the most recent block and sequentially access the block's parents. Since blocks can also be fetched by their number (and not only the hash) in some blockchains, a user could also access a sequence of blocks by just incrementing or decrementing the block number. Then the user needs to traverse each block's stored service data, most of which are irrelevant, to find the service data that matches the user's query.

In some cases, a request for information is received by a blockchain node to query service data stored in the blockchain. Instead of querying the service data in the blockchain, the blockchain node runs the request for information on the relational database. The request for information is converted to a query that is supported by the relational database and the query is then executed on the relational database. The relational database provides higher query efficiency than querying the blockchain. Certainly, if a relational database has not been created yet, the request for information can be accomplished by querying the blockchain.

What is claimed is:

1. A computer-implemented method, comprising:
  receiving, by a blockchain node, a service request, the service request comprising one or more data types and respective service data corresponding to the one or more data types that are stored in a blockchain;
  determining a service type corresponding to the service request;
  parsing the service request to obtain each data type of the service request and service data corresponding to each data type;
  determining that no relational database has been created to correspond to the service type;
  creating a relational database to correspond to the service type; and
  storing the service data that is obtained through parsing in the relational database.

2. The computer-implemented method of claim 1, wherein parsing the service request to obtain each data type of the service request and service data corresponding to each data type comprises parsing the service request according to a data storage format specified by a smart contract of the blockchain.

3. The computer-implemented method of claim 2, further comprising:
  processing the smart contract to determine the service type and the one or more data types defined by the smart contract; and
  creating, in the relational database, a database table corresponding to the service type having one or more columns corresponding respectively to the one or more data types defined in the smart contract.

4. The computer-implemented method of claim 2, further comprising:
  processing the smart contract to determine identification information corresponding to the service request; and
  creating, in the relational database, a database table corresponding to the identification information corresponding to the service request.

5. The computer-implemented method of claim 1, further comprising:
  receiving a request for information about service data having a data type stored in the blockchain;
  querying the relational database to obtain service data matching the data type; and providing the service data matching the data type in response to the request.

6. The computer-implemented method of claim 5, wherein the request for information about service data is a request to execute a smart contract on a consensus network.

7. The computer-implemented method of claim 1, further comprising:
   converting, based on a predetermined data format, each data type that comprised in the service request and the service data corresponding to each data type, to obtain a data sequence;
   performing consensus procedure on the service request by using a consensus network; and
   storing the data sequence in the blockchain corresponding to the blockchain node after a consensus is achieved on the service request.

8. The computer-implemented method of claim 1, further comprising converting, based on a predetermined statement format, at least one of each data type, the service data corresponding to each data type, the service type, or identification information obtained through parsing, to obtain a data storage statement for the relational database, and
   wherein storing the service data in the relational database comprises executing the data storage statement.

9. The computer-implemented method of claim 8, wherein the predetermined statement format comprises an identification information field and a service type field.

10. The computer-implemented method of claim 1, wherein the service request comprises a service data query request.

11. The computer-implemented method of claim 4, wherein the identification information comprises a user public key or a user identity.

12. A non-transitory, computer-readable medium storing one or more instructions executable by a computer system to perform operations comprising:
   receiving, by a blockchain node, a service request, the service request comprising one or more data types and respective service data corresponding to the one or more data types that are stored in a blockchain;
   determining a service type corresponding to the service request;
   parsing the service request to obtain each data type of the service request and service data corresponding to each data type;
   determining that no relational database has been created to correspond to the service type;
   creating a relational database to correspond to the service type; and
   storing the service data that is obtained through parsing in the relational database.

13. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving, by a blockchain node, a service request, the service request comprising one or more data types and respective service data corresponding to the one or more data types that are stored in a blockchain;
      determining a service type corresponding to the service request;
      parsing the service request to obtain each data type of the service request and service data corresponding to each data type;
      determining that no relational database has been created to correspond to the service type;
      creating a relational database to correspond to the service type; and
      storing the service data that is obtained through parsing in the relational database.

14. The computer-implemented system of claim 13, wherein parsing the service request to obtain each data type of the service request and service data corresponding to each data type comprises parsing the service request according to a data storage format specified by a smart contract of the blockchain.

15. The computer-implemented system of claim 14, further comprising:
   processing the smart contract to determine the service type and the one or more data types defined by the smart contract; and
   creating, in the relational database, a database table corresponding to the service type having one or more columns corresponding respectively to the one or more data types defined in the smart contract.

16. The computer-implemented system of claim 14, further comprising:
   processing the smart contract to determine identification information corresponding to the service request; and
   creating, in the relational database, a database table corresponding to the identification information corresponding to the service request.

17. The computer-implemented system of claim 13, further comprising:
   receiving a request for information about service data having a data type stored in the blockchain;
   querying the relational database to obtain service data matching the data type; and
   providing the service data matching the data type in response to the request.

18. The computer-implemented system of claim 17, wherein the request for information about service data is a request to execute a smart contract on a consensus network.

19. The computer-implemented system of claim 13, further comprising:
   converting, based on a predetermined data format, each data type that comprised in the service request and the service data corresponding to each data type, to obtain a data sequence;
   performing consensus procedure on the service request by using a consensus network; and
   storing the data sequence in the blockchain corresponding to the blockchain node after a consensus is achieved on the service request.

20. The computer-implemented system of claim 13, further comprising converting, based on a predetermined statement format, at least one of each data type, the service data corresponding to each data type, the service type, or identification information obtained through parsing, to obtain a data storage statement for the relational database, and
   wherein storing the service data in the relational database comprises executing the data storage statement.

* * * * *